Feb. 15, 1955     C. F. LAUTZ     2,702,099
SHOCK ABSORBER WITH REBOUND CUSHIONING VALVE
Filed June 4, 1949
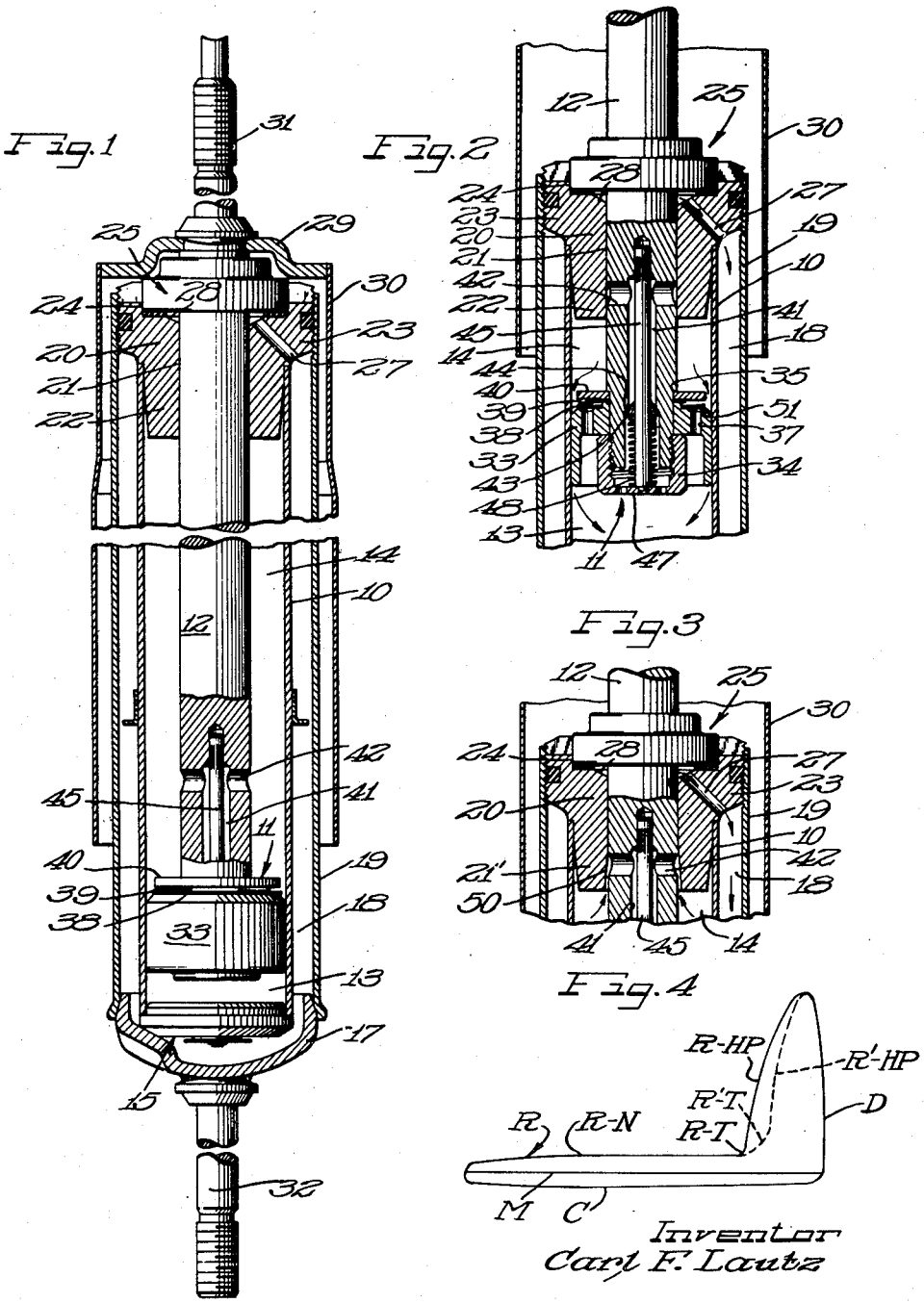
Inventor
Carl F. Lautz
By The Firm of Charles W. Hills Attys United States Patent Office  2,702,099
Patented Feb. 15, 1955

2,702,099

SHOCK ABSORBER WITH REBOUND CUSHIONING VALVE

Carl. F. Lautz, Buffalo, N. Y., assignor to Houdaille-Hershey Corporation, Detroit, Mich., a corporation of Michigan Application June 4, 1949, Serial No. 97,155

3 Claims. (Cl. 188—88)

The present invention relates to improvements in direct acting shock absorbers and more particularly concerns improvements in the operating characteristics of such shock absorbers.

An important object of the present invention is to provide improvements in direct acting shock absorbers for improving the operation and performance of direct acting shock absorbers by novel control of the rebound action thereof.

Another object of the invention is to provide improvements in direct acting shock absorbers for effecting rebound stroke-end damping.

A further object of the invention is to provide improved means in direct acting shock absorber construction for greatly increasing the resistance to rebound extension of the telescopically related parts of the shock absorber assembly towards the end of the rebound stroke.

Yet another object of the invention is to provide multistage damping in direct acting hydraulic shock absorbers.

Other objects, features and advantages of the present invention will be readily apparent from the following detailed description of certain preferred embodiments thereof taken in conjunction with the accompanying drawing in which:

Figure 1 is a vertical fragmental sectional view through a hydraulic shock absorber embodying features of the present invention;

Figure 2 is a fragmentary vertical sectional view through the upper portion of the hydraulic shock absorber showing the piston in rebound stroke position;

Figure 3 is a fragmentary vertical sectional view through the upper portion of a slightly modified form of shock absorber embodying the invention; and Figure 4 is a stroke-resistance diagram.

Direct acting shock absorbers operate on the principle of controlled displacement of hydraulic fluid within a cylinder by the operation of a piston working in the cylinder. Such a direct acting shock absorber is shown in Figures 1 and 2 and includes a cylinder 10 within which is reciprocably operable a piston 11 mounted on a piston rod 12. The piston 11 divides the interior of the elongated cylinder 10 into a compression chamber 13 and a rebound chamber 14.

At its compression end the cylinder 10 is assembled with a foot valve assembly 15 carried by an end cap 17 and controlling hydraulic fluid displacement between the compression chamber 13 and a reservoir chamber 18 surrounding the cylinder 10 and enclosed by a tubular reservoir casing 19 secured as by welding or the like to the end cap 17 and disposed concentric with the cylinder 10.

At its upper or rebound chamber end, the cylinder 10 is assembled in preferably press fit relation with a concentric piston rod bearing member 20 having a central bearing bore 21 through which the piston rod 12 is reciprocably slidable in fairly close bearing relation. A generally axially extending flange 22 on the bearing member fits within the associated end portion of the cylinder 10 within which it is maintained fixedly by reason of threaded engagement of a lateral head flange 23 on the bearing member within the adjacent end portion of the reservoir casing tube 19 which for this purpose extends concentrically beyond the adjacent end of the cylinder 10.

Carried fixedly by the bearing plug member 20 within an outer end recess 24 is a shaft seal unit 25 through which the piston rod 12 is movable and which prevents leakage of hydraulic fluid past or with the piston rod as the latter moves out of the rebound chamber 14 as an incident to relative extension of the piston and cylinder during rebound stroke.

For return of hydraulic fluid scavenged from the piston rod 12 or which may be forced past the piston rod through the bearing bore 21, a fluid return passage 27 communicates between a scavenging chamber 28 within the base of the seal seat recess 24 and the reservoir 18.

As is usual, the outer end of the piston rod 12 carries a protector and compression-limiting cap 29. A gravel guard 30 is carried by the cap 29.

Means for attaching the shock absorber to relatively movable members between which the shock absorber is to operate for damping the relative movements comprise a stud terminal 31 on the outer end of the piston rod 12 and a stud element 32 on the outer end of the end closure cap 17.

In service, as for example in an automotive vehicle where the shock absorber is connected between the sprung and unsprung portions of the vehicle, the piston 11 normally assumes a substantially central position longitudinally within the cylinder 10. On compression stroke, that is on such relative movement of the piston and cylinder, compelled by action of the structures to which the shock absorber is attached, to carry the piston 11 toward the bottom of the cylinder 10 as seen in Fig. 1, hydraulic fluid is displaced from the compression chamber 13 under the control of the foot valve assembly 15 and the piston 11. On reverse or rebound movement, that is extension movement of the piston and the cylinder, pressure fluid is displaced from the rebound chamber 14 under the control of the piston 11.

For fluid displacement control, the piston 11 comprises a construction comprising valve controlled hydraulic fluid passages. To this end, the piston 11 comprises an assembly including a cylindrical piston body 33 which is in slidable bearing relation to the inner surface of the cylinder 10 and is of generally inverted cup shape and centrally bored to fit about a reduced diameter inner extremity portion of the piston rod 12. Securing the piston body on the piston rod is a nut 34 which is threaded onto the inner extremity of the piston rod and drives the piston body toward a stop shoulder 35 at the end of the reduced diameter portion of the piston rod where it joins the full diameter portion of the rod.

For relatively free compression fluid displacement from the compression chamber 13 to the rebound chamber 14 during compression stroke of the piston, a plurality of compression displacement passages 37 are provided in the head portion of the piston body. The displacement ports 37 are checked against the rebound fluid displacement by a check valve ring plate 38 which is normally biased onto its fluid checking seat by means of a fingered leaf spring 39 which is secured to operate in a gap between the ported head of the piston body and a stop washer 40 which is secured between the shoulder 35 on the piston rod and the inner offset margin of the piston body 33 substantially as shown in Fig. 2. Thus, on compression stroke hydraulic fluid can displace relatively freely into the rebound chamber 14, compression damping resistance accruing from the displacement control of the foot valve assembly 15 with respect to the hydraulic fluid displaced from the cylinder 10 by the piston rod 12.

On rebound, the check valve 38 closes the compression displacement passages 37 and compels displacement of hydraulic fluid from the rebound chamber 14 to the compression chamber 13 by way of a passage 41 axially within the inner end portion of the piston rod 12 and communicating with the rebound pressure chamber 14 by way of a transverse bore 42 provided outwardly beyond the stop washer 40 and communicating with the compression chamber 13 through the inner end of the piston rod.

Predetermined resistance to rebound fluid displacement is afforded by a rebound blow-off valve 43 which seats against an annular valve seat 44 provided within the rebound displacement passage 41 and guided for reciprocable seating and unseating movement by a guide rod 45 concentric within the passage 41 and having its lower end held concentric by means of a spider 47 on the retaining nut 34. Predetermined rebound blow-off resistance for the valve 43 is provided by a coiled compression spring 48 seated at one end on the spider 47 and at the other end bearing against the blow-off valve 43 for normally holding the valve on its seat 44 with predetermined pressure. Thus, the displacement passage 41 is normally checked against compression displacement of hydraulic fluid therethrough and predetermined resistance to rebound blow-off is provided. This resistance, insofar as the spring 48 is concerned is substantially uniform throughout the rebound stroke.

Where the conditions causing rebound stroke of the piston 11 are such that rebound will continue to the limit of rebound of the piston, it has heretofore been customary to rely upon rebound bumper means such as rubber bumpers to stop the rebound and cushion the shock occasioned by the sudden stop. This is an expense which is eliminated by the present invention, according to which the function of the prior bumpers is taken over by the shock absorber. The method by which such additional damping is effected in the shock absorber itself is by substantially increasing rebound resistance toward the end of the rebound stroke of the piston by blocking off flow of hydraulic fluid from the rebound chamber of the shock absorber through the rebound blow-off passage provided in the assembly. The degree or suddenness of the increased resistance can be readily modified to meet various practical requirements by appropriately controlling the escape of hydraulic fluid from the rebound chamber in the shock absorber beginning at a predetermined point in the rebound stroke while the first part of the rebound stroke may be resisted with preset substantial uniformity.

Simple and efficient means for carrying into practice the last stage increased rebound stroke resistance comprises affording a cooperative control valve relationship between the bearing flange 22 and the blow-off escape orifices provided by the transverse bore 42 whereby, as best seen in Fig. 2, the rebound blow-off passageway is substantially blocked at a predetermined point near the end of the rebound stroke of the piston 11. Hence the bearing flange 22 is substantially elongated as compared with conventional practice, and the rebound orifices 42 are spaced a substantial distance from the stop washer 40 and thus the piston 11. As a result, at a predetermined point before the end of the rebound stroke of the piston 11, the blow-off orifices 42 are substantially blocked as movement of the piston rod 12 through the bearing member 20 eventually causes envelopment of the blow-off orifice portion of the piston rod by the bearing flange 22.

Although as shown in Figure 2 blockage of the blow-off orifices 42 is virtually complete when the orifices have been fully surrounded by the bearing flange 22, the transition to greater rebound blow-off resistance will be determined by the size of the orifices 42 or the respective positions of the orifices longitudinally of the piston rod 12. For example, as shown the orifices 42 are part of a transverse bore and therefore the orifices are coaxial. Moreover the orifices as shown are cylindrical. This is the most economical form of the orifices since they can be thus produced by a single drilling operation diametrically through the piston rod. The transition from normal rebound blow-off resistance to last stage increased blow-off resistance will therefore be determined by the diameter of the orifice bore and the speed of rebound extension of the piston rod as the orifices pass the fluid flow cut-off edge of the bearing flange 22 and are progressively cut off from the blow-off pressure chamber 14. However, various modifications in the multi-stage damping by increased rebound blow-off resistance can be effected by varying the shape of one or more of the rebound blow-off orifices 42 such as elongating the mouth of one or both of the orifices longitudinally of the piston rod or staggering the mouths of the orifices longitudinally of the piston rod. Additional stages of damping resistance which may be progressive can be effected by appropriate relative spacing of the orifices 42 longitudinally of the piston rod so that on severe rebound there will be progressive stages of rebound resistance.

A simple and efficient expedient for modifying blow-off displacement resistance build-up is shown in Figure 3 wherein is depicted a shock absorber structure in most respects identical with the shock absorbed structure already described, as indicated by coincidence of reference numerals but in which the bearing member 20 has a modified inner coaxial flange 21'. Accordingly, the bearing flange 21' is formed with a flaring tapered internal bore portion 50 opening from the inner end of the flange. Thereby the rebound blow-off discharge ports 42 are gradually cut off by the tapering restriction afforded by the tapering cut-off flange bore 50 as the piston rod 12 moves outwardly into the bearing bore. The pitch and length of the tapered bore portion 50 will determine the restriction characteristics thereof with respect to the rebound blow-off orifices 42.

Complete stoppage of hydraulic fluid during the final stage increased rebound blow-off resistance is not necessarily desirable, but a certain volume of hydraulic fluid will continue to escape from the rebound pressure chamber 14 while rebound pressure continues by bleeding off of the fluid under high restriction past the piston body 33 through the close sliding clearance between the periphery of the piston body and the inner surface of the cylinder 10 as shown by directional arrows in Figure 2, and by similar leakage of the pressure fluid past the piston rod 12 through the bore in the bearing member 20 and thence returning to the reservoir 18, as indicated by directional arrows in Figures 2 and 3. A small metered volume of the pressure fluid will, of course, continue to be displaced through one or more displacement orifice grooves 51 provided for normal low volume displacement purpose in the margin of the valve body defining a seat for the compression blow-off valve 38. As a result, there is a continuing damping action of the shock absorber even during the period or periods of increased rebound blow-off resistance in the last stages of the rebound action of the shock absorber. This affords a desirable cushioning effect which avoids and in fact absorbs shock in the last part of the rebound stroke.

In order to show graphically the performance of shock absorbers embodying the present invention, reference is made to the diagram in Figure 4 patterned upon the record made by the recording stylus of a pressure indicator of well known testing apparatus utilized for the purpose of testing the performance of fluid pressure apparatus such as hydraulic shock absorbers. In the diagram, the straight horizontal line M represents a median between compression and rebound pressures and may be considered as zero. Below the median line is a line C representing compression pressures and above the median line M is a line R representing rebound pressures. In a hydraulic shock absorber as shown in Figures 1 and 2, the resistance afforded by the compression blow-off valve arrangement of the foot valve 15 is substantially uniform, substantially as depicted by the pressure line C.

By reason of the pressure resistance of the valve biasing spring 48 of the rebound blow-off valve 43, substantially uniform rebound fluid displacement resistance is afforded throughout at least the first part of the rebound stroke of the piston with only very slight fluctuation as depicted by the section of the rebound pressure line R and identified as R–N indicating the normal rebound pressure resistance for which the shock absorber has been set. Then, as the rebound displacement orifices 42 are covered by the bearing flange 22 there is a more or less rapid transition to increased pressure and thereafter continuing greatly increased pressure to the end of the rebound stroke. The transition to increased pressure is depicted by the curved rebound pressure line portion R–T, and the high pressure resistance is depicted by the portion of the rebound pressure line identified as R–HP. Following rebound the pressure, of course, drops promptly to the median line M, as indicated by the pressure drop line D.

Where the transition from normal rebound pressure to high pressure in the multi-stage rebound damping is more gradual as effected by the modification of Fig. 3, the rebound pressure results are depictable substantially as indicated by the dash line of Figure 4 wherein the curved portion of the line R'–T depicts the gradual transition while the sharply rising portion of the line R'–HP depicts the full high pressure resistance developed as a result of rebound pressure control according to the present invention.

In a typical shock absorber wherein compression pressure attained a maximum of 83 pounds per square inch and normal rebound pressure attained a value of approximately 113 pounds per square inch, a maximum of 1039 pounds per square inch was attained during the high pressure rebound resistance stage of the rebound stroke. This was in a shock absorber embodying the construction of Figures 1 and 2.

It will be readily apparent, of course, that various modifications and variations may be effected without departing from the scope of the novel concepts of the present invention.

I claim as my invention:

1. In combination in a direct acting hydraulic shock absorber including a cylinder and a piston operable in the cylinder, a piston rod, a bearing structure at the end of the cylinder through which the piston rod emerges and surrounding the piston rod, a rebound blow-off fluid passageway through said piston rod having an orifice opening through the surface of the piston rod spaced from the piston, and means on the bearing structure cooperating with said orifice in the end portion of the rebound stroke of the piston to control rebound displacement of hydraulic fluid therethrough and create a condition of increased resistance to rebound movement of the piston, said means comprising a gradually tapered recess in said bearing which cooperates with said orifice to progressively and gradually restrict flow through said orifice as said rod moves out through said bearing on the rebound stroke, said tapered recess and bearing being effective to close said orifice completely before said piston strikes the end of said cylinder on said rebound stroke thereby preventing bottoming of said shock absorber.

2. In combination in a hydraulic direct acting shock absorber, a cylinder, a piston reciprocable in said cylinder, a piston rod on said piston extending from one end of the cylinder, a bearing plug axially bored and having the piston rod extending slidably therethrough, said bearing plug being mounted within the end of the cylinder from which the piston rod extends, the piston and said bearing plug defining a rebound pressure chamber, a blow-off valve-controlled rebound blow-off displacement passage through said piston rod having blow-off orifice spaced from said piston, and a flange extending into said cylinder from said bearing plug operable to provide blow-off displacement block with respect to said displacement passage orifice in a predetermined portion of the rebound stroke of the piston, said flange annularly surrounding said piston rod and having a tapered mouth which is effective to restrict gradually the displacement blow-off through said orifice during the rebound stroke in cooperation with the piston rod and which is effective to close off the flow through said orifice before said piston can strike the end of said cylinder.

3. In combination in a direct acting hydraulic shock absorber including a cylinder and a piston operable in the cylinder, a piston rod member, a bearing member at the end of the cylinder through which the piston rod member emerges and surrounding the piston rod member, a rebound blow-off fluid passageway through said piston rod member having an orifice opening through the surface of the piston rod member at a point spaced from the piston and means on one of said members cooperating with said orifice in the end portion of the rebound stroke of the piston to control rebound displacement of hydraulic fluid therethrough and create a condition of increasing resistance to rebound movement of the piston, said means comprising a tapered recess in one of said members cooperating with the other of said members to progressively and gradually restrict flow through said orifice as said rod member moves out through said bearing member on the rebound stroke and effective to close off completely flow through said orifice before said piston can strike the end of said cylinder thereby preventing bottoming of said shock absorber.

References Cited in the file of this patent

UNITED STATES PATENTS

| | | |
|---|---|---|
| 1,013,384 | Flentje | Jan. 2, 1912 |
| 1,365,030 | Flentje | Jan. 11, 1921 |
| 2,092,259 | Padgett | Sept. 7, 1937 |
| 2,182,016 | Deutsch | Dec. 5, 1939 |
| 2,346,275 | Read et al. | Apr. 17, 1944 |
| 2,351,662 | Christofel | June 20, 1944 |
| 2,668,604 | Chisholm | Feb. 9, 1954 |
| | (Corresponds to Canada No. 470,716) | |

FOREIGN PATENTS

| | | |
|---|---|---|
| 470,716 | Canada | Jan. 9, 1951 |